(12) United States Patent
Liu et al.

(10) Patent No.: US 8,345,104 B2
(45) Date of Patent: *Jan. 1, 2013

(54) SYSTEM AND METHOD FOR TESTING IMAGE CAPTURING FUNCTION OF AN ELECTRONIC DEVICE

(75) Inventors: Qing-Hua Liu, Shenzhen (CN); De-Gang Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 439 days.

This patent is subject to a terminal disclaimer.

(21) Appl. No.: 12/701,550

(22) Filed: Feb. 6, 2010

(65) Prior Publication Data

US 2011/0102576 A1    May 5, 2011

(51) Int. Cl.
*H04N 17/00* (2006.01)
*H04N 5/225* (2006.01)
(52) U.S. Cl. .................................... 348/187; 348/220.1

(58) Field of Classification Search .................. 348/187, 348/188, 175, 176, 220.1, 221.1, 125, 143, 348/177, 179, 180; 702/116
See application file for complete search history.

(56) References Cited

U.S. PATENT DOCUMENTS

| | | | |
|---|---|---|---|
| 7,911,532 B2 * | 3/2011 | Pai et al. | 348/376 |
| 2007/0297647 A1 * | 12/2007 | Hung-Chi | 382/114 |
| 2008/0151099 A1 * | 6/2008 | Lin et al. | 348/376 |
| 2009/0086192 A1 * | 4/2009 | He et al. | 356/73 |

* cited by examiner

*Primary Examiner* — Behrooz Senfi
(74) *Attorney, Agent, or Firm* — Altis Law Group, Inc.

(57) ABSTRACT

A method for testing an image capturing function of an electronic device includes following blocks. A test program package with an exemplar image is installed in the electronic device. The electronic device is placed on a test fixture used for limiting an image capturing position and an image capturing angle of the electronic device. The electronic device captures an image to be tested by the electronic device. The image to be tested is compared with the exemplar image to determine whether the image capturing function of the electronic device is satisfactory.

19 Claims, 5 Drawing Sheets

SYSTEM AND METHOD FOR TESTING IMAGE CAPTURING FUNCTION OF AN ELECTRONIC DEVICE

BACKGROUND

1. Technical Field

The present disclosure relates to a system and method for testing an image capturing function of a portable electronic device.

2. Description of Related Art

Today, more electronic devices, (e.g., cell phones, PDAs, notebook computers) have cameras to capture images. In order to provide qualified electronic devices to consumers, it is necessary to examine the images captured by the electronic devices.

One typical method to test the image capturing function of the electronic device includes following steps: taking a photo of an object; and inspecting whether the image has any visible defect to determine whether the image capturing function of the electronic device is satisfactory. However, the typical test method needs operators to manually inspect the photo captured by the electronic device, which is inefficient, and the test result may be not accurate.

In order to test the image capturing function of the electronic device more efficiently, an automatic test software has been designed. The electronic device takes a photo of a standard picture card, and the test software is used to automatically compare the picture card and the photo captured by the electronic device to determine whether the image capturing function of the electronic device is satisfactory. However, the distance and angle at which the electronic device captures the photo is variable, and the test result may be not accurate.

A test system and method for testing an image capturing function of an electronic device efficiently and accurately is desired.

DETAILED DESCRIPTION

Figure 1:
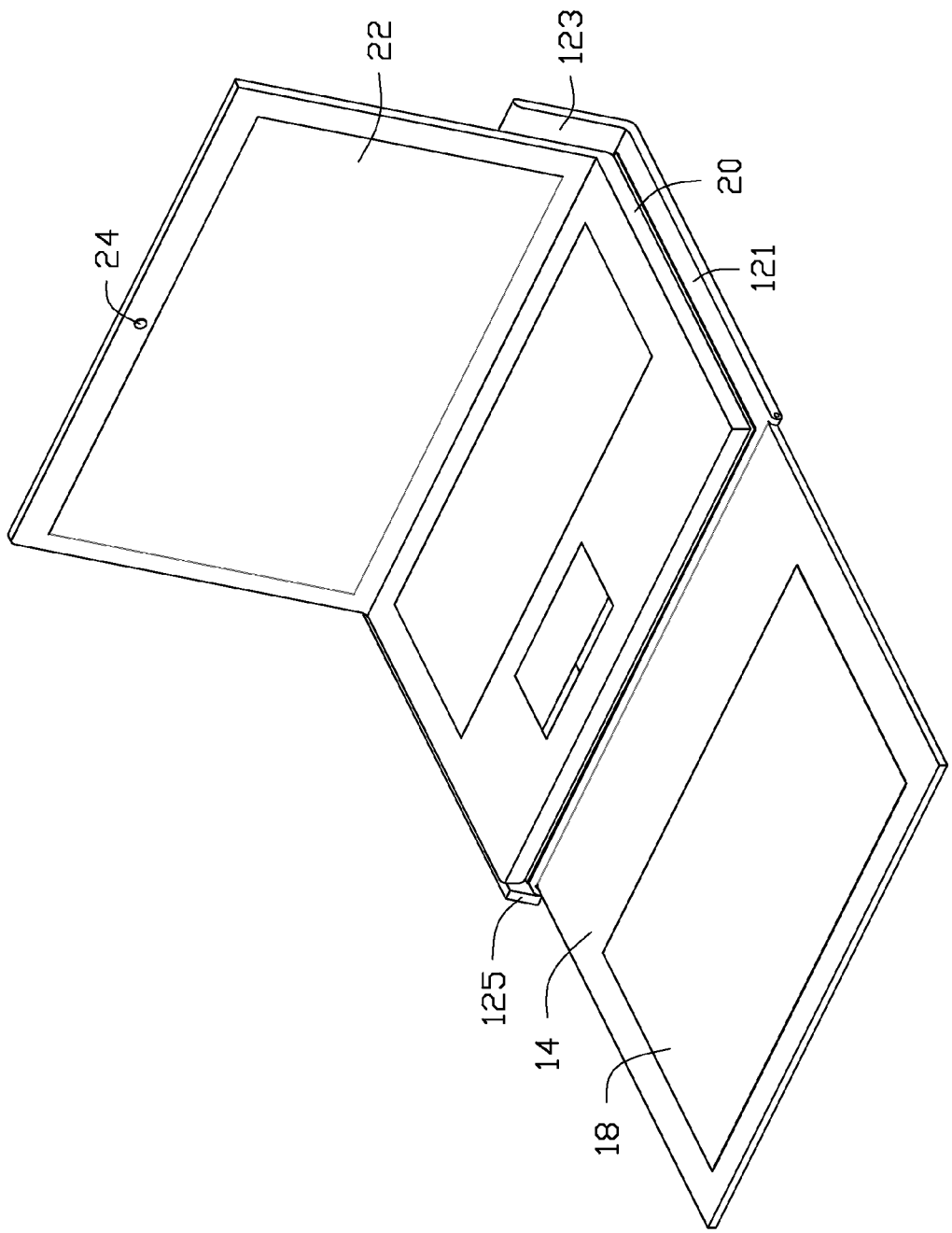
FIG. 1 is a view of a test fixture with a notebook computer placed thereon according to the present disclosure.
Figure 2:
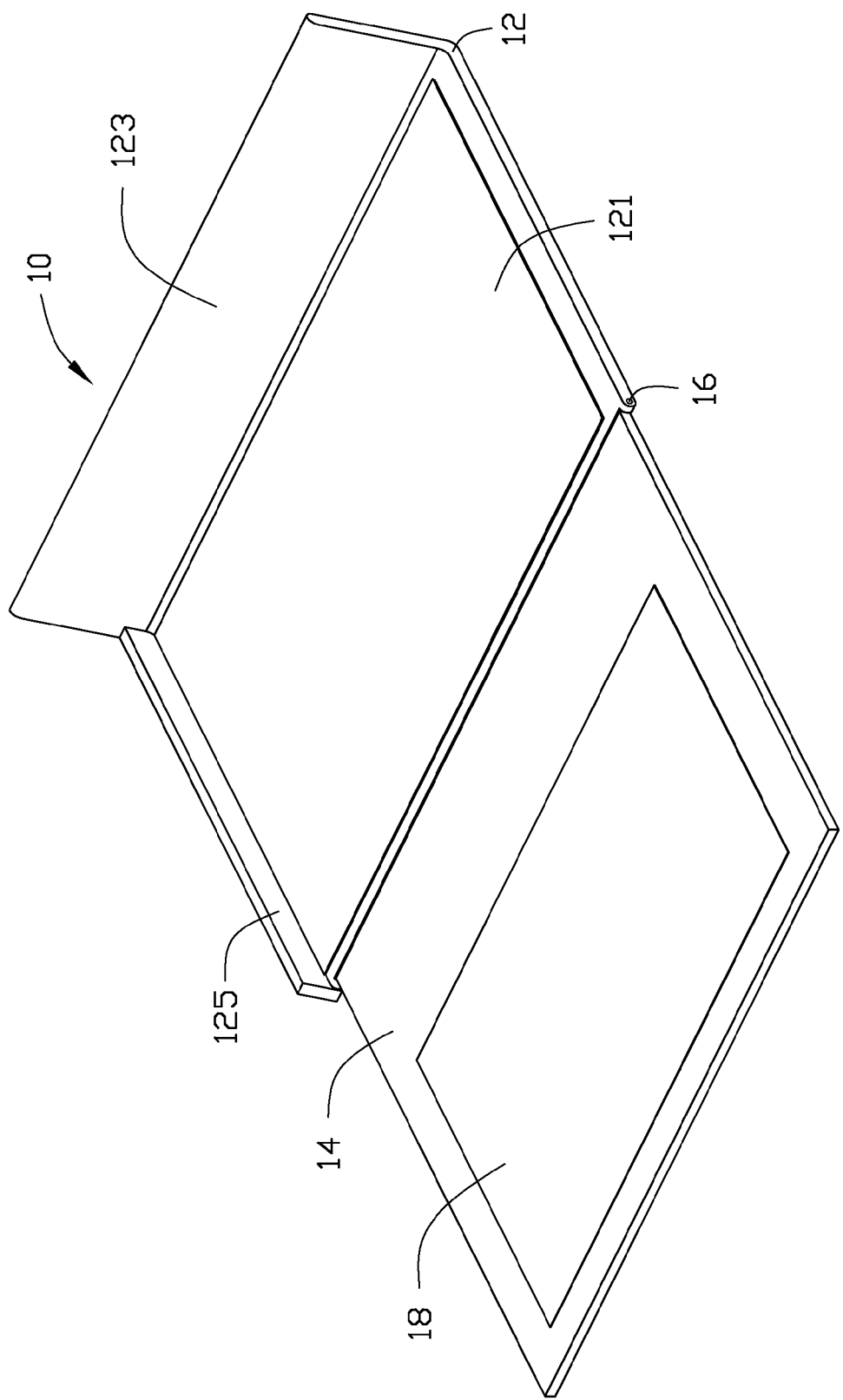
FIG. 2 is another view of the test fixture in FIG. 1.
Figure 3:
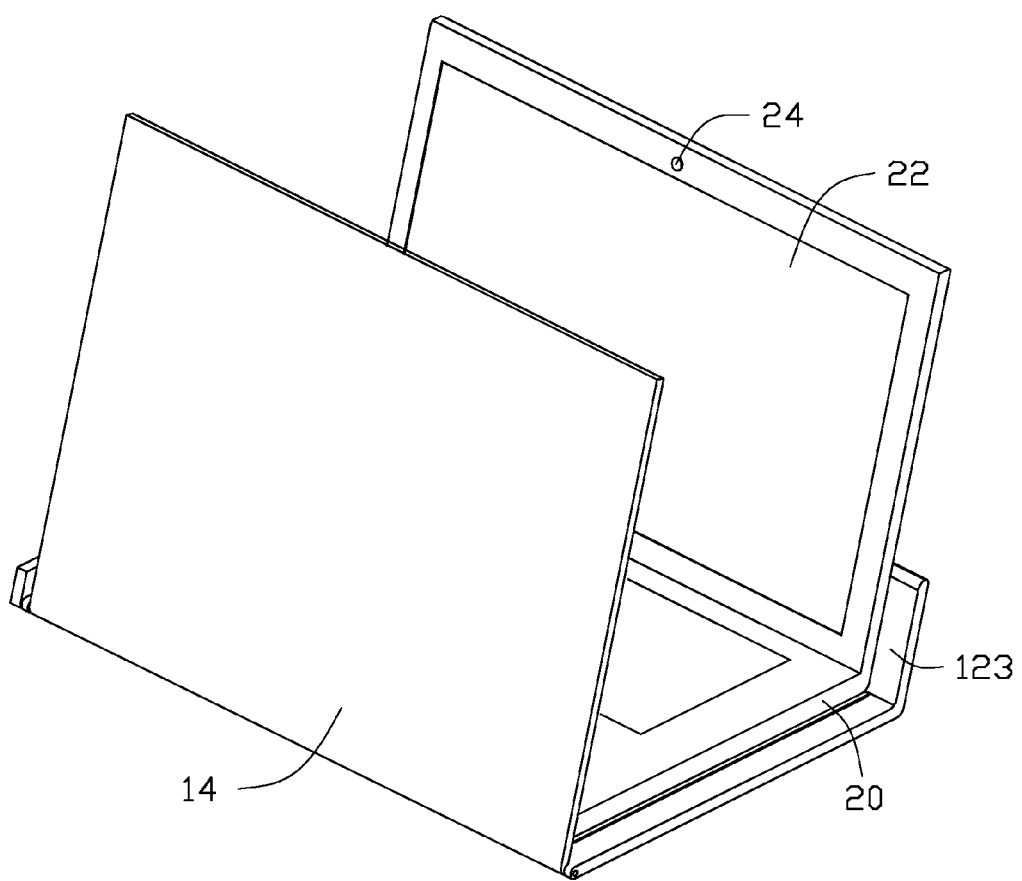
FIG. 3 is similar to the FIG. 1, but showing a pivotable panel of the test fixture rotated upwardly to a different angle.
Figure 4:
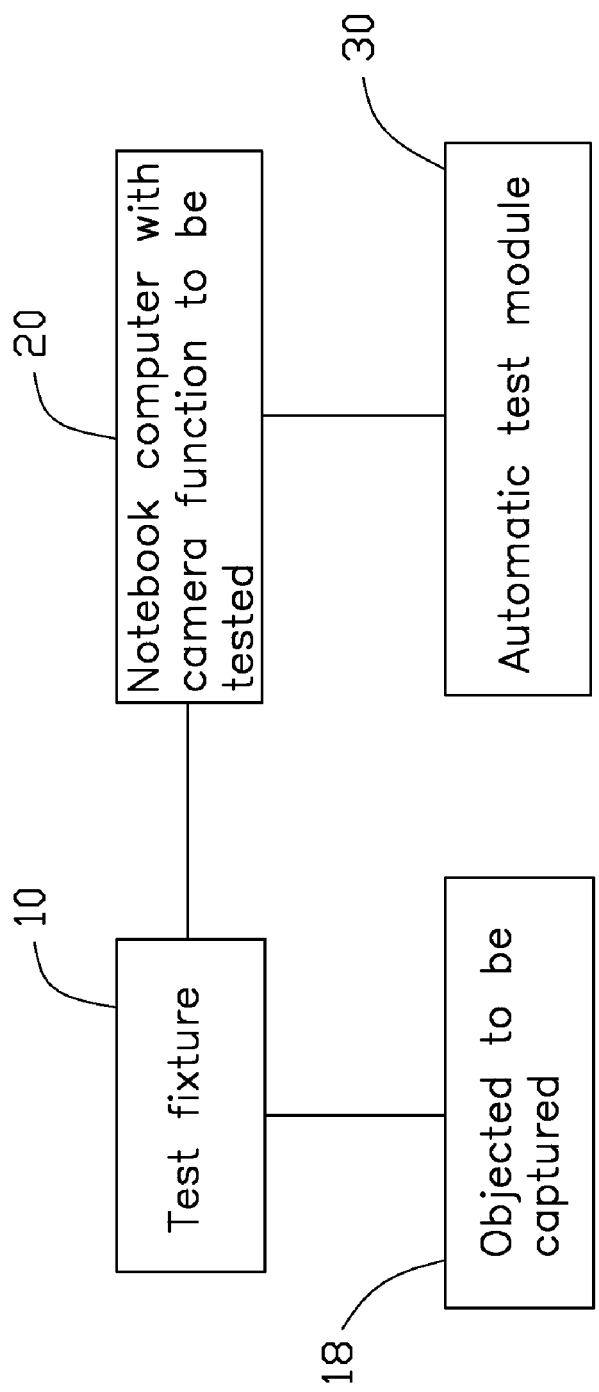
FIG. 4 is a block diagram of a system for testing an image capturing function of an electronic device according to the present disclosure.

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic imbedded in hardware or firmware, or to a collection of software instructions, written in a programming language, such as, Java, C, or assembly. One or more software instructions in the modules may be imbedded in firmware, such as an EPROM. It will be understood that modules may comprise of connected logic units, such as gates and flip-flops, and may also be comprised of programmable units, such as programmable gate arrays or processors. The modules described herein may be implemented as either software and/or hardware modules and may be stored in any type of computer-readable medium or other computer storage device.

Referring to FIGS. 1 to 4, an embodiment of a test system in accordance with the present disclosure includes a test fixture 10 and a notebook computer 20 with an image capturing function to be tested. In the embodiment, the notebook computer 20 is to be tested in a product line. The notebook computer 20 includes a display panel 22 and a camera lens 24 mounted above the display panel 22. The test fixture 10 includes a seat 12 and a pivotable panel 14 pivotally attached to the seat 12. The seat 12 includes a base panel 121 for supporting the notebook computer 20, a rear flange panel 123 extending from a rear edge of the base panel 121, and a side flange panel 125 extending from a side edge of the base panel 121. A height of the side flange panel 125 is less than that of the rear flange panel 123. The pivotable panel 14 is pivotally attached to a front side of the base panel 121 via a pivot 16 and is capable of being fixed at a desired angle by static friction. An object 18 to be captured by the notebook computer 20 is attached on an inner side of the pivotable panel 14. In the embodiment, the objected 18 to be tested is a picture card.

During the testing of the image capturing function of the notebook computer 20, the notebook computer 20 is placed on the base panel 121 and secured by the rear flange panel 123 and the side flange panel 125. The opening angle of the monitor 22 relative to a main body of the notebook computer 20 is substantially equal to an angle between the base panel 121 and the rear flange panel 123. The pivotable panel 14 is rotated to an appropriate angle and fixed there by the static friction. Then the notebook computer 20 can then capture an image of the picture card 18 at a desired position and angle. An automatic test module 30 is capable of comparing the image with an exemplar image to determine whether the image captured by the notebook computer 20 is qualified. In the embodiment, the automatic test module 30 is installed in the notebook computer 20 and contains the exemplar image.

In the embodiment, each notebook computer in the product line is capable of being placed on the seat 12 of the test fixture 10 in a same position, thereby keeping the photo capturing distance and angle constant. Thus, it will improve the efficiency and accuracy of the test.

Figure 5:
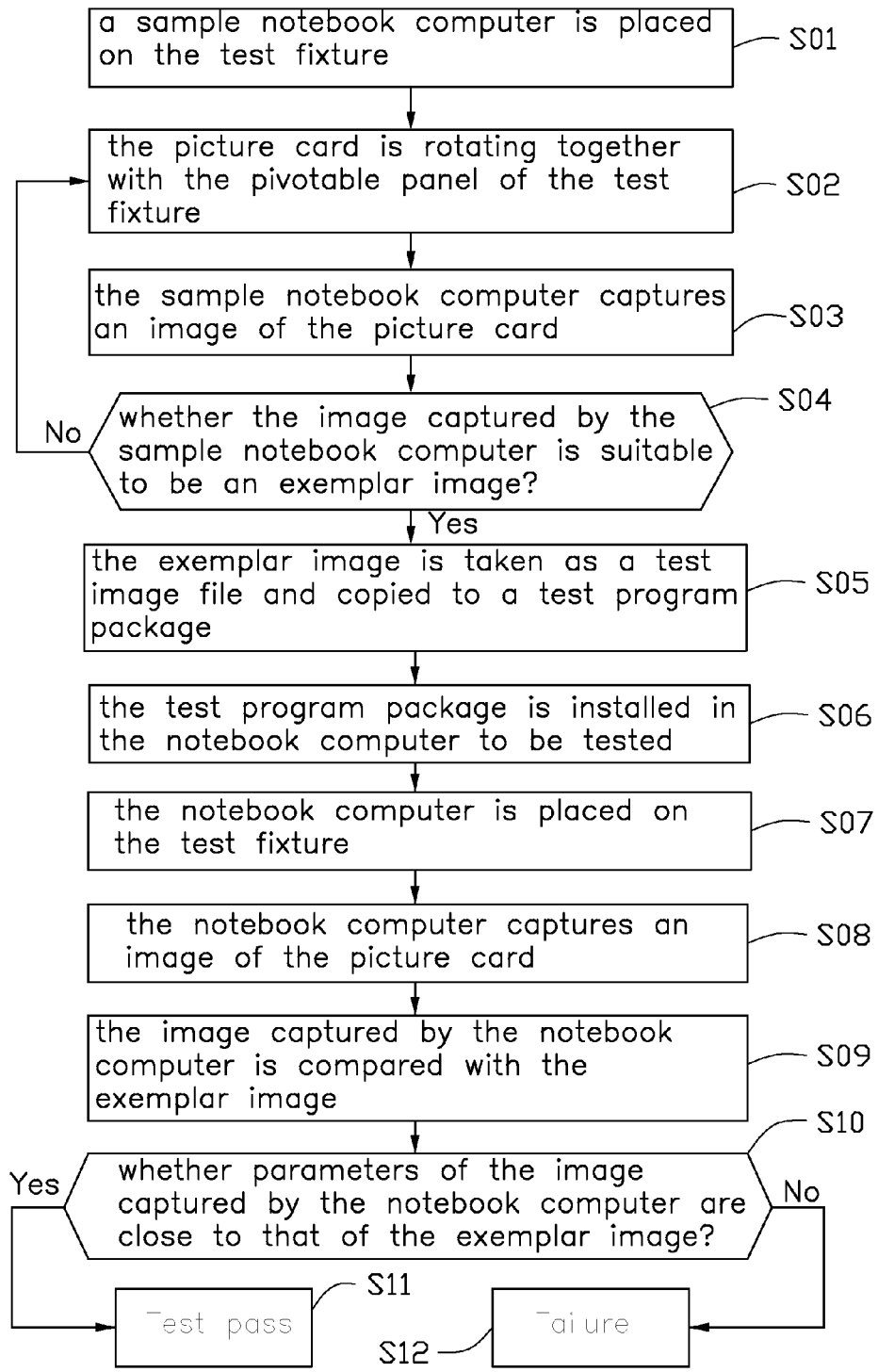
FIG. 5 is a flow chart of a method for testing an image capturing function of an electronic device according to the present disclosure.

Referring to FIG. 5, an operational sequence, according to one embodiment of above described test system, includes following blocks.

In block S01, a sample notebook computer is placed on the base panel 121 of the test fixture 10 and secured by the rear flange panel 123 and the side flange panel 125. An opening angle of the monitor of the sample notebook computer is substantially equal to the angle between the base panel 121 and the rear flange panel 123. The sample notebook computer has passed a previous image capturing test and has a satisfactory image capturing function.

In block S02, the picture card 18 is attached on the pivotable panel 14 of the test fixture 10 and rotating together with the pivotable panel 14 to reach an appropriate angle.

In block S03, the sample notebook computer utilizes it's camera to capture a image of the picture card 18.

In block S04, the image captured by the sample notebook computer is checked for suitability as an exemplar image. If the image is suitable to be an exemplar image, go to block S05. If the image is not suitable to be an exemplar image, go back to block S02 to continue rotating the pivotable panel 14 until reaching the appropriate angle where a suitable exemplar image can be captured.

In block S05, the exemplar image is utilized as a test image file and copied to a test program package.

In block S06, the test program package is installed in all notebook computers to be tested in the product line.

In block S07, the notebook computer 20 is placed on the seat 12 of the test fixture 10 in the same position and opening angle as the sample notebook computer.

In block S08, the notebook computer 20 utilizes its camera lens 24 to capture an image of the picture card 18.

In block S09, the image captured by the notebook computer 20 is compared with the exemplar image.

In block S10, it is determined whether the parameters (intensity, RGB values, etc.) of the image captured by the notebook computer 20 are close enough to that of the exemplar image. If the parameters of the image captured by the notebook computer 20 are close enough to that of the exemplar image, go to block S11; if not, go to block S12.

In block S11, a test pass result is presented.

In block S12, a failure result is presented.

Utilizing above described method, the image capturing function of other notebook computers in the product line can also be tested.

In the embodiment, the exemplar image file can be a single photo or an video file, and the notebook computer to be tested can take the same photo or video as the sample notebook computer did. Thus, a video capturing function and a photo capturing function of the notebook computer can be tested. The above described system and method can also be used to test other electronic devices, such as cell phones, PDAs, etc.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

It is also to be understood that the above description and the claims drawn to a method may include some indication in reference to certain steps. However, the indication used is only to be viewed for identification purposes and not as a suggestion as to an order for the steps.

What is claimed is:

1. A system for testing an image capturing function of at least one electronic device, the system comprising:
    a test fixture for securing the at least one electronic device;
    an object to be captured by the at least one electronic device; and
    an automatic test module with an exemplar image;
    wherein when the at least one electronic device capturing an image of the object, the automatic test module is capable of comparing the image of the object with the exemplar image to determine whether the image capturing function of the at least one electronic device falls within predetermined parameters; the test fixture comprises a seat for securing the at least one electronic device and a panel connected to the seat, the object is attached to the panel, and the panel is parallel to a monitor of the electronic device when the at least one electronic device captures the image of the object.

2. The system of claim 1, wherein the seat comprises a base panel for supporting the at least one electronic device thereon, a rear flange panel extending from a rear edge of the base panel, and a side flange panel extending from a side edge of the base panel.

3. The system of claim 2, wherein a height of the side flange panel is less than that of the rear flange panel.

4. The system of claim 2, wherein the panel is pivotally attached to a front side of the base panel, and the rear flange panel and the side flange panel abut the electronic device.

5. The system of claim 2, wherein an angle between the base panel and the rear flange panel is substantially equal to an opening angle of a monitor of the electronic device.

6. The system of claim 1, wherein the object is a picture card attach on an inner side of the panel of the test fixture.

7. The system of claim 1, wherein the automatic test module is installed in the at least one electronic device.

8. The system of claim 1, wherein the at least one electronic device is a notebook computer with a camera lens.

9. A method for testing an image capturing function of an electronic device comprising:
    installing a test program package with an exemplar image in the electronic device;
    placing the electronic device on a test fixture, wherein the test fixture comprises a seat, the seat comprises a base panel for supporting the at least one electronic device thereon and a rear flange panel connected to a rear edge of the base panel, and an angle between the base panel and the rear flange panel is substantially equal to an opening angle of a monitor of the at least one electronic device;
    capturing an image to be tested by the electronic device; and
    comparing the image to be tested with the exemplar image to determine whether the image capturing function of the electronic device falls within predetermined parameters.

10. The method of claim 9, wherein the step of placing the electronic device on the test fixture comprising securing the electronic device on the seat of the test fixture.

11. The method of claim 9, further comprising rotating a pivotable panel of the test fixture to an appropriate angle before capturing the image.

12. The method of claim 11, further comprising attaching a picture card on the pivotable panel.

13. The method of claim 12, wherein the pivotable panel with the picture card attached thereon is rotated to the appropriate angle where the pivotable panel is parallel to a monitor of the electronic device.

14. The method of claim 9, furthering comprising collecting the exemplar image and copying the exemplar image to the test program package before installing the test program package.

15. The method of claim 9, wherein the step of comparing the image to be tested with the exemplar image comprises comparing intensities and RGB values of the image to be tested with that of the exemplar image.

16. The method of claim 15, wherein if differences between the image to be tested and the exemplar image falls within predetermined ranges, a test pass result is presented; and if differences between the image to be tested and the exemplar image exceed predetermined ranges, a failure result is presented.

17. A system, comprising:
    an electronic device comprising a display and a camera lens mounted above the display panel; and
    a test fixture comprising a seat and a pivotal panel, the seat comprising a base panel and a rear flange connected to a rear edge of the base panel, an object attached to the pivotal panel;
    wherein the electronic device is placed on the base panel with the display abutting the rear flange, an angle between the base panel and the rear flange panel is substantially equal to an opening angle of a monitor of the electronic device, the camera lens faces to the object and is configured to capture an image of the object.

18. The system of claim 17, wherein the pivotal panel is parallel to the monitor of the electronic device when the camera lens captures the image of the object.

19. The system of claim 17, further comprising an automatic test module, wherein the automatic test module is configured to compare the image of the object with an exemplar image.

* * * * *

UNITED STATES PATENT AND TRADEMARK OFFICE
CERTIFICATE OF CORRECTION

| | | |
|---|---|---|
| PATENT NO. | : 8,345,104 B2 | Page 1 of 1 |
| APPLICATION NO. | : 12/701550 | |
| DATED | : January 1, 2013 | |
| INVENTOR(S) | : Qing-Hua Liu and De-Gang Liu | |

It is certified that error appears in the above-identified patent and that said Letters Patent is hereby corrected as shown below:

Title Page, below Item (65) insert

-- (30)     Foreign Application Priority Data

October 31, 2009   (CN) ......................2009 1 0309187 --

Signed and Sealed this
Twenty-second Day of October, 2013

Teresa Stanek Rea
*Deputy Director of the United States Patent and Trademark Office*